(12) United States Patent
Oya et al.

(10) Patent No.: US 12,392,445 B2
(45) Date of Patent: Aug. 19, 2025

(54) COMPOSITE TYPE HEAT INSULATOR AND METHOD FOR PRODUCING THE SAME

(71) Applicant: IMAE INDUSTRY CO., LTD., Osaka (JP)

(72) Inventors: Naoyuki Oya, Osaka (JP); Kimihiko Sugiura, Osaka (JP); Shuya Kawaoka, Osaka (JP); Kenji Imae, Osaka (JP); Yoshihiko Imae, Osaka (JP)

(73) Assignee: IMAE INDUSTRY CO., LTD., Osaka (JP)

( * ) Notice: Subject to any disclaimer, the term of this patent is extended or adjusted under 35 U.S.C. 154(b) by 368 days.

(21) Appl. No.: 17/299,992

(22) PCT Filed: Mar. 6, 2020

(86) PCT No.: PCT/JP2020/009564
§ 371 (c)(1),
(2) Date: Jun. 4, 2021

(87) PCT Pub. No.: WO2021/095279
PCT Pub. Date: May 20, 2021

(65) Prior Publication Data
US 2022/0018485 A1    Jan. 20, 2022

(30) Foreign Application Priority Data

Nov. 15, 2019    (JP) .................. 2019-206787

(51) Int. Cl.
*F16L 59/02* (2006.01)
*B32B 5/02* (2006.01)
*B32B 9/04* (2006.01)

(52) U.S. Cl.
CPC .............. *F16L 59/028* (2013.01); *B32B 5/02* (2013.01); *B32B 9/04* (2013.01); *F16L 59/029* (2013.01);
(Continued)

(58) Field of Classification Search
CPC ......... Y10T 428/249924; Y10T 428/25; Y10T 428/252; Y10T 428/256; Y10T 428/259;
(Continued)

(56) References Cited

U.S. PATENT DOCUMENTS 9,984,794 B1 * 5/2018 Imae ........................ H01B 7/29
2011/0150717 A1 6/2011 Kumar et al.
(Continued)

FOREIGN PATENT DOCUMENTS

CN    205395314 U  *  7/2016
CN    108749206 A  *  11/2018    ............. B32B 27/12
(Continued)

OTHER PUBLICATIONS

Machine translation (Espacenet) of JP 2009-299893 A. Translated Oct. 21, 2023. (Year: 2023).*
(Continued)

*Primary Examiner* — Maria V Ewald
*Assistant Examiner* — Ethan A. Utt
(74) *Attorney, Agent, or Firm* — GREENBLUM & BERNSTEIN, P.L.C.

(57) ABSTRACT

Provided are a composite type heat insulator having an excellent heat insulating properties at high temperatures regardless of its thin body, and a method for producing the same. The composite type heat insulator comprises a first and a second cloths composed of silica fibers having a hydroxyl group; and a heat insulating layer sandwiched between the first and the second cloths. The heat insulating layer contains a silica aerogel and silica staple fibers having a fiber length of 0.5 to 5 mm. The heat insulating layer may optionally contain an infrared absorber and/or a film-forming inorganic binder.

8 Claims, 8 Drawing Sheets

(52) U.S. Cl.
CPC ....... *B32B 2250/03* (2013.01); *B32B 2250/40* (2013.01); *B32B 2262/10* (2013.01); *B32B 2307/304* (2013.01); *B32B 2307/732* (2013.01)

(58) Field of Classification Search
CPC .......... Y10T 428/31663; Y10T 442/20; Y10T 442/2139; Y10T 442/2148; Y10T 442/259; Y10T 442/2607; Y10T 442/2631; Y10T 442/2664; Y10T 442/2926; Y10T 442/2975; Y10T 442/30; Y10T 442/3976; Y10T 442/2984; Y10T 442/40; Y10T 442/50; Y10T 442/60; Y10S 428/92; B32B 5/00; B32B 5/02; B32B 5/022; B32B 5/024; B32B 5/206; B32B 5/16; B32B 5/22; B32B 5/24; B32B 5/26; B32B 5/262; B32B 5/265; B32B 7/00; B32B 7/02; B32B 7/023; B32B 7/027; B32B 7/04; B32B 9/00; B32B 9/005; B32B 9/04; B32B 9/047; B32B 9/048; B32B 2305/02; B32B 2305/026; B32B 2305/22; B32B 2305/30; B32B 2307/30; B32B 2307/304; B32B 2307/306; B32B 2307/40; F01N 3/00; F01N 3/08; F01N 3/10; F01N 3/24; F01N 3/28; F01N 3/2839; F01N 3/2853; F01N 3/2864; F01N 3/2871; F01N 3/2882; F01N 2310/00; F01N 2310/06; F01N 2310/14; F16L 59/00; F16L 59/02; F16L 59/026; F16L 59/029; F16L 59/08; F16L 59/10

USPC .... 428/292.1, 323, 325, 328, 331, 446, 447, 428/448, 920; 442/59, 76, 77, 131, 133, 442/136, 140, 172, 178, 181, 301, 302, 442/304, 320, 327

See application file for complete search history.

(56) References Cited

U.S. PATENT DOCUMENTS

| | | |
|---|---|---|
| 2013/0344279 A1 | 12/2013 | Doshi et al. |
| 2014/0342115 A1 | 11/2014 | Sakane et al. |
| 2015/0204477 A1* | 7/2015 | Menzel ................. F16L 59/028 252/62 |
| 2018/0346770 A1* | 12/2018 | Itano ...................... B32B 15/10 |
| 2019/0249816 A1 | 8/2019 | Van Gucht et al. |

FOREIGN PATENT DOCUMENTS

| | | | | |
|---|---|---|---|---|
| CN | 108793984 | | 11/2018 | |
| JP | 2009299893 A | * | 12/2009 | |
| JP | 2013-024214 | | 2/2013 | |
| JP | 2013-514496 | | 4/2013 | |
| JP | 2015-528071 A | | 9/2015 | |
| JP | 2018-140554 | | 9/2018 | |
| JP | 2018-168806 | | 11/2018 | |
| WO | WO-2017138463 A1 | * | 8/2017 | ............... B27N 3/06 |

OTHER PUBLICATIONS

Machine translation (Espacenet) of CN 108749206 A. Translated May 30, 2024. (Year: 2024).*
Machine translation (Espacenet) of CN 205395314 U. Translated Sep. 20, 2024. (Year: 2024).*
Shuya Kawaoka et al., "Preparation and characterization of silica-fiber / aerogel composite heat insulations", The 30th International Symposium on Transport Phenomena, Nov. 1-3, 2019., pp. 29-32.
Official Communication issued in International Bureau of WIPO Patent Application No. PCT/JP2020/009564, dated Jun. 2, 2020, along with an English translation thereof.

* cited by examiner

[Fig.1]
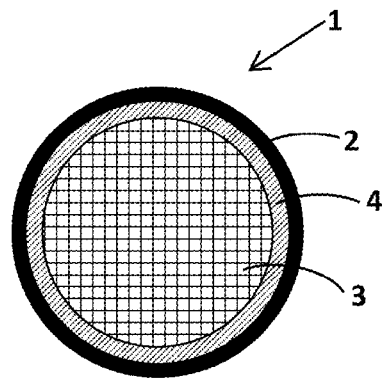
[Fig.2]
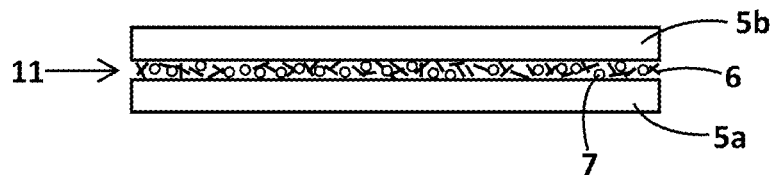
[Fig.3]
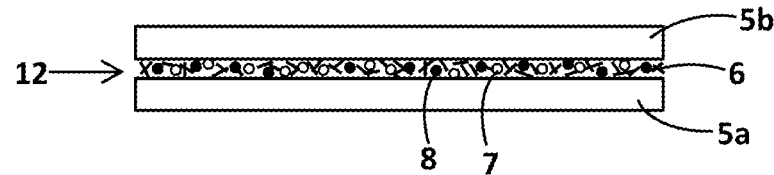
[Fig.4]
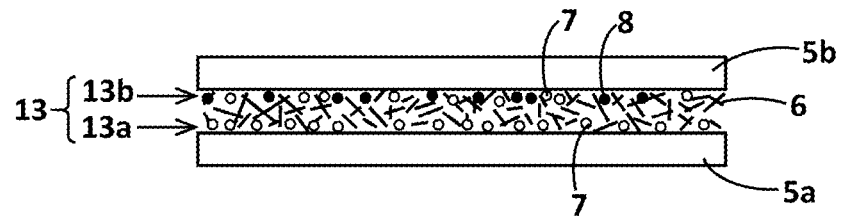

[Fig.5]
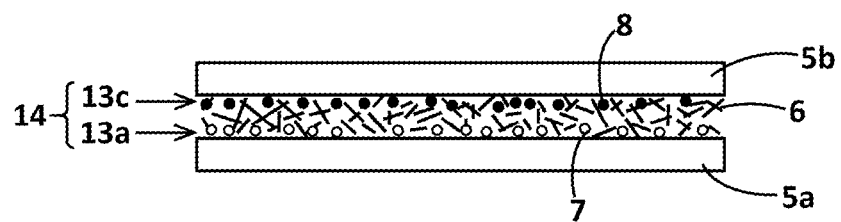
[Fig.6]
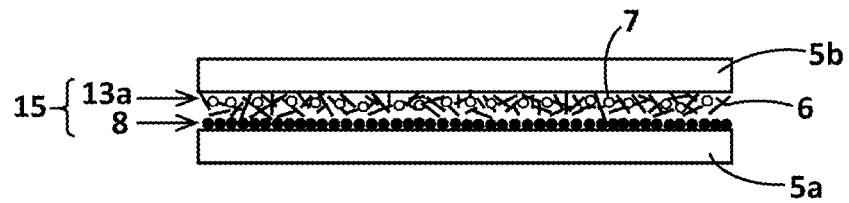
[Fig.7]
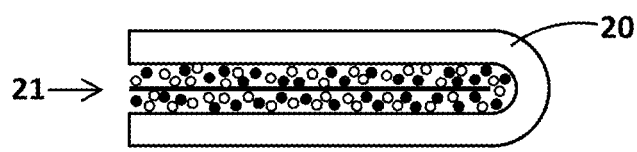

[Fig.8]
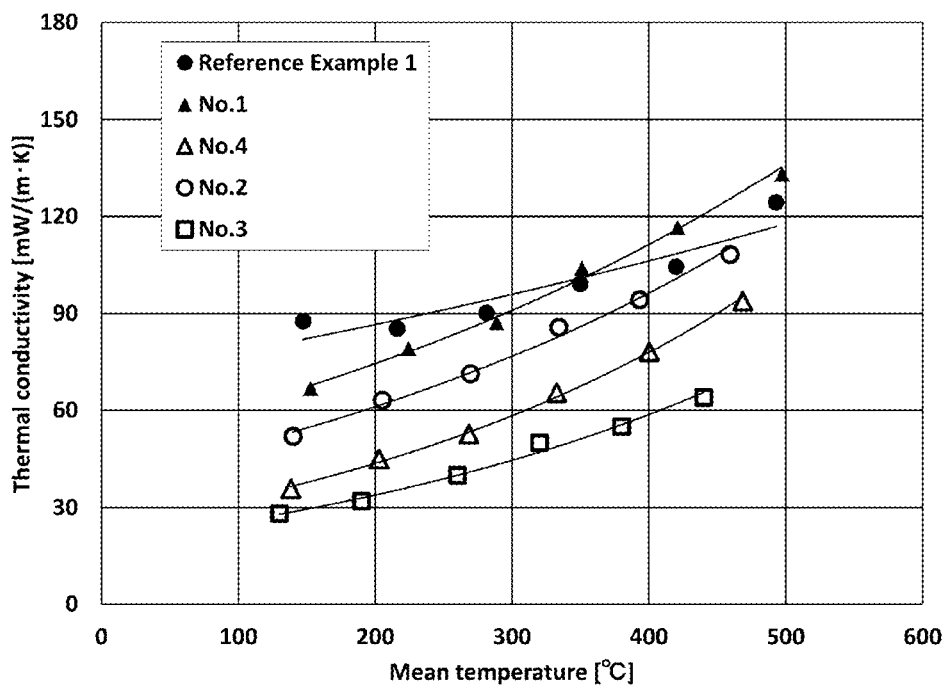
[Fig.9]
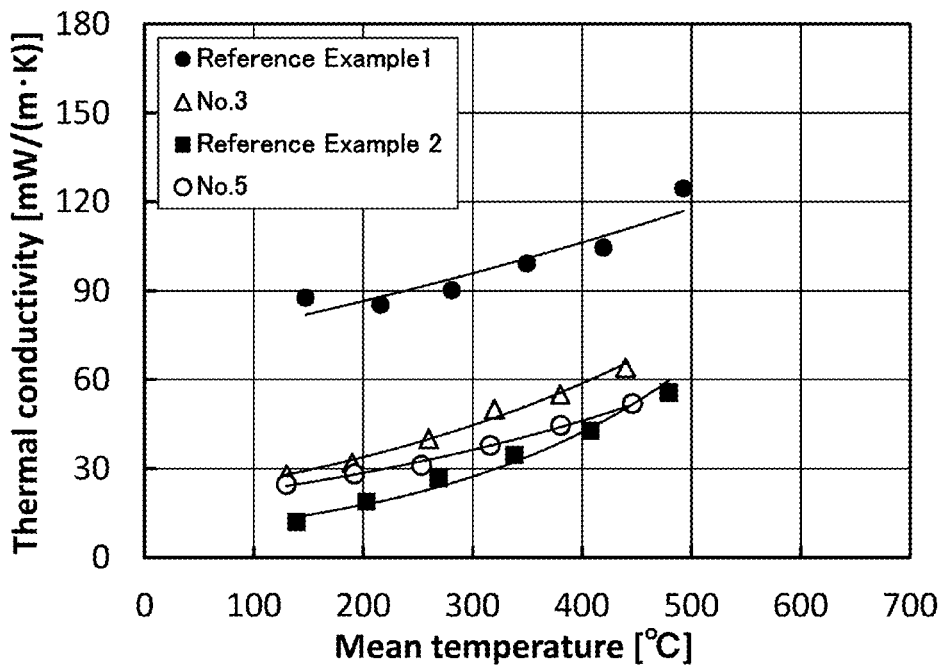

[Fig.10]
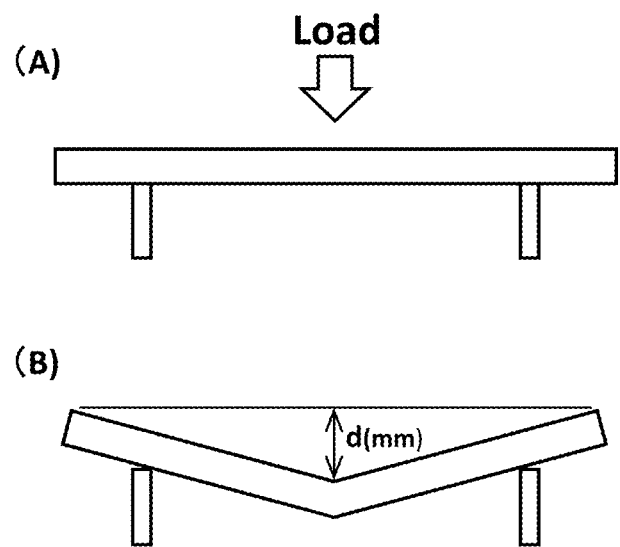
[Fig.11]
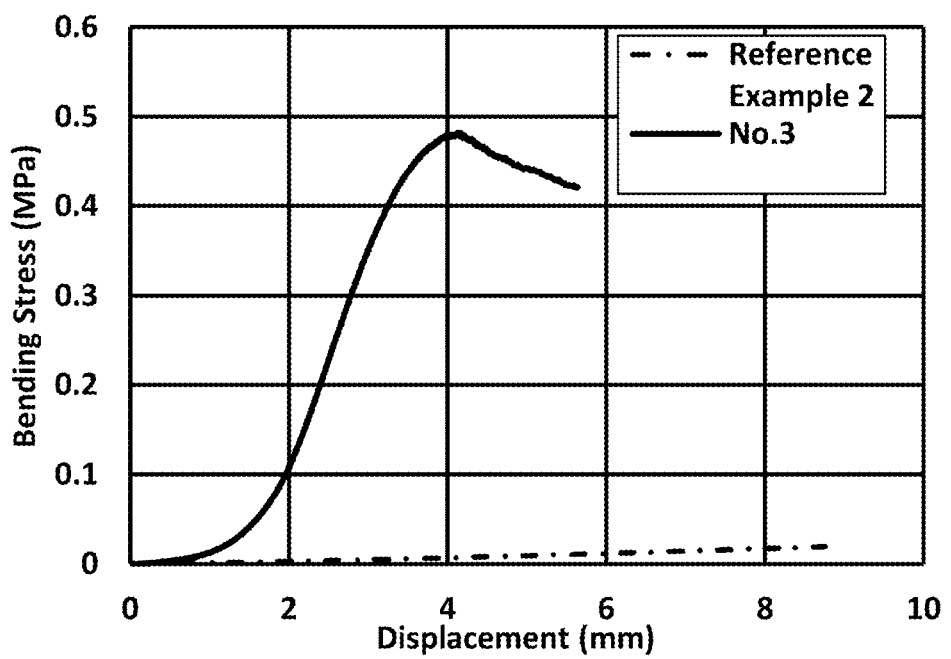

[Fig.12]
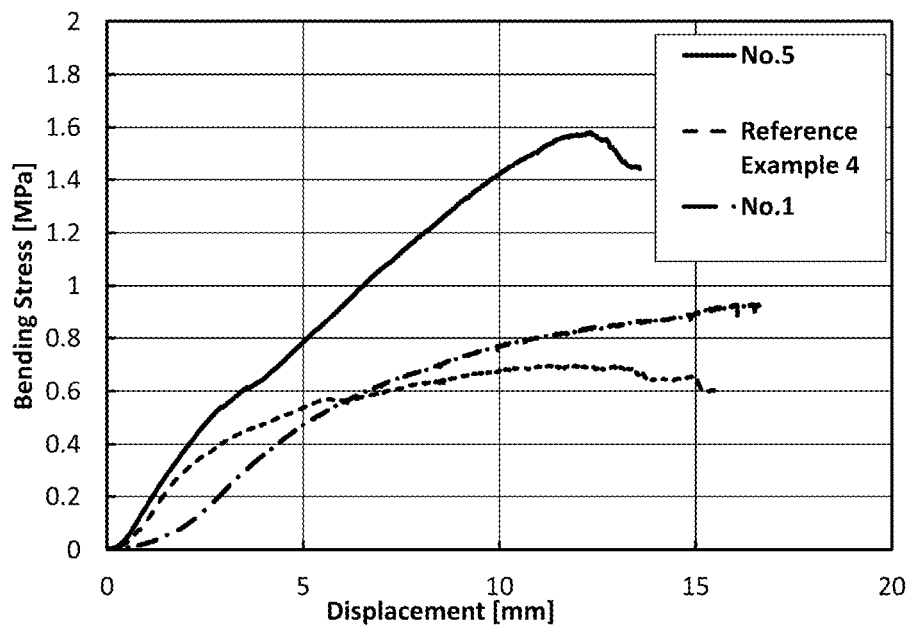
[Fig.13]
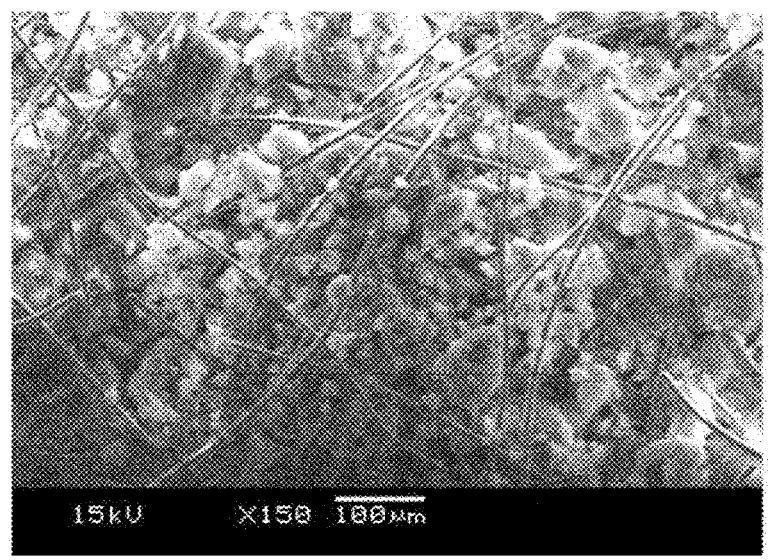

[Fig.14]
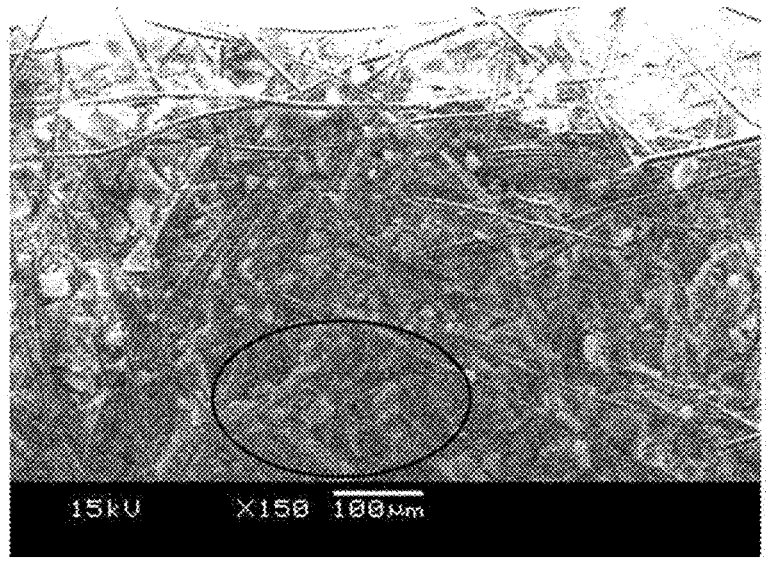
[Fig.15]
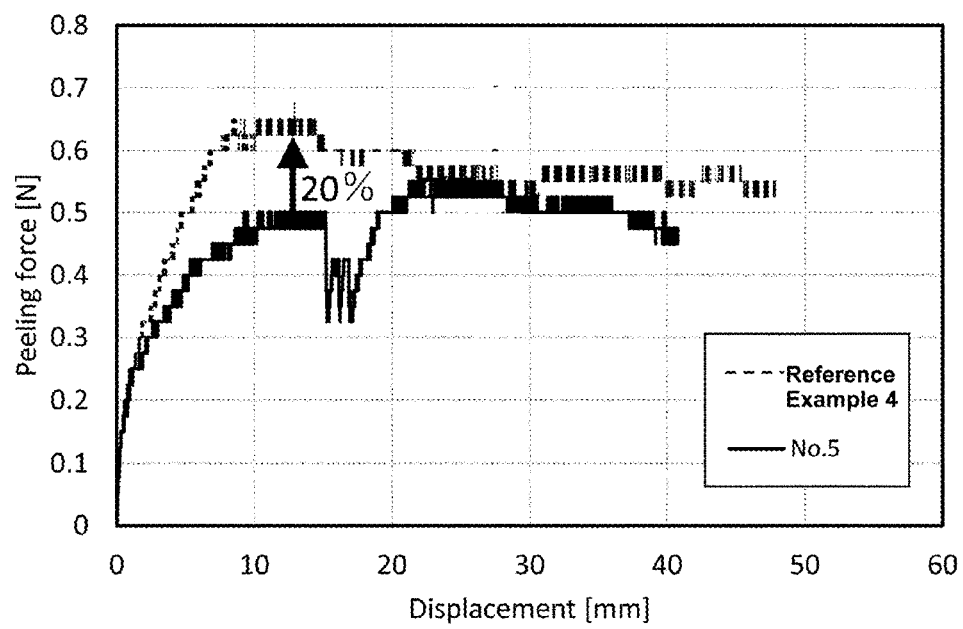

[Fig.16]
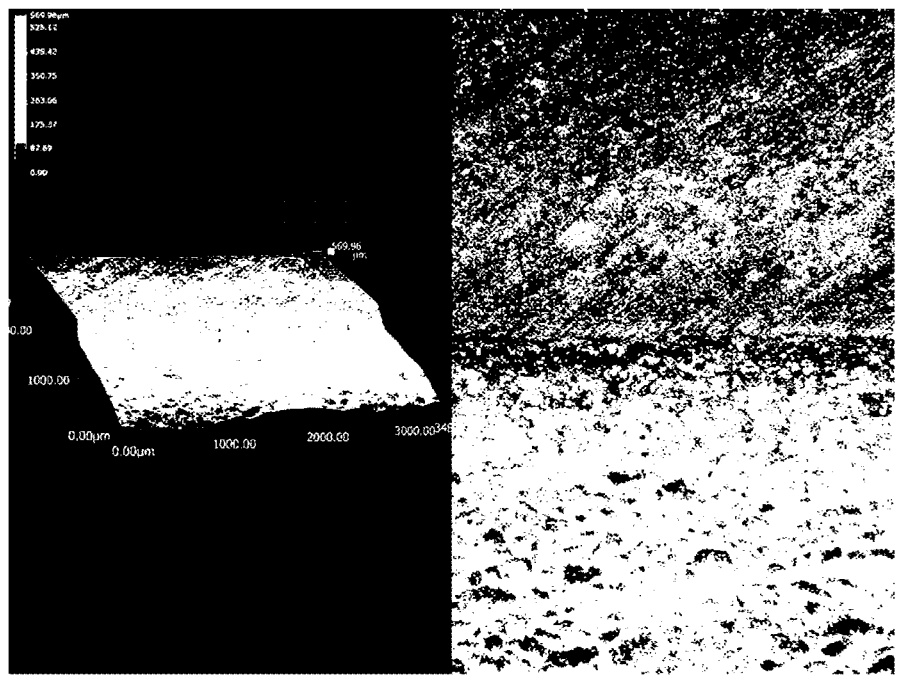
[Fig.17]
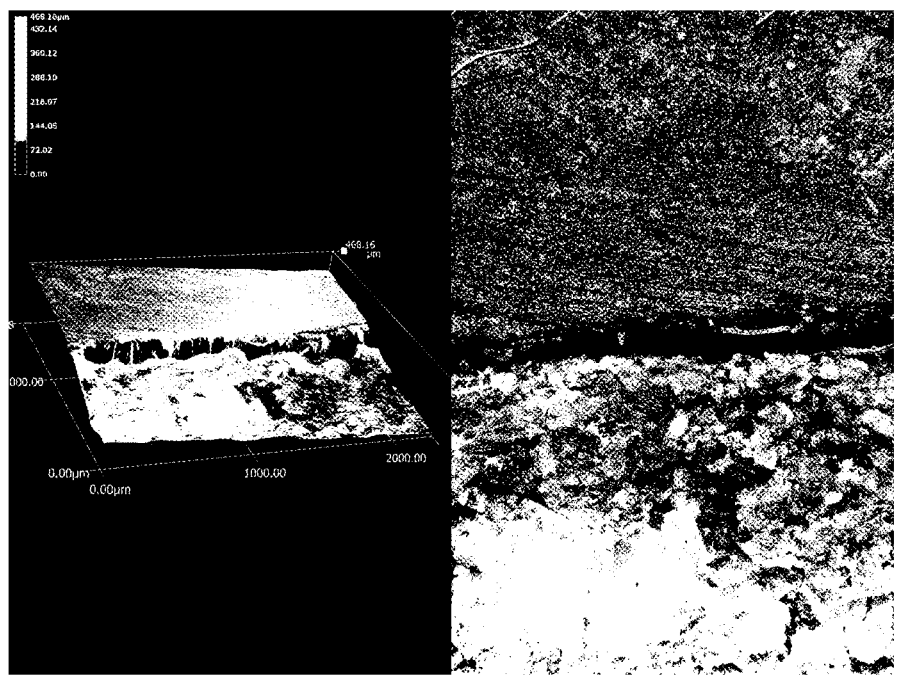

[Fig.18]
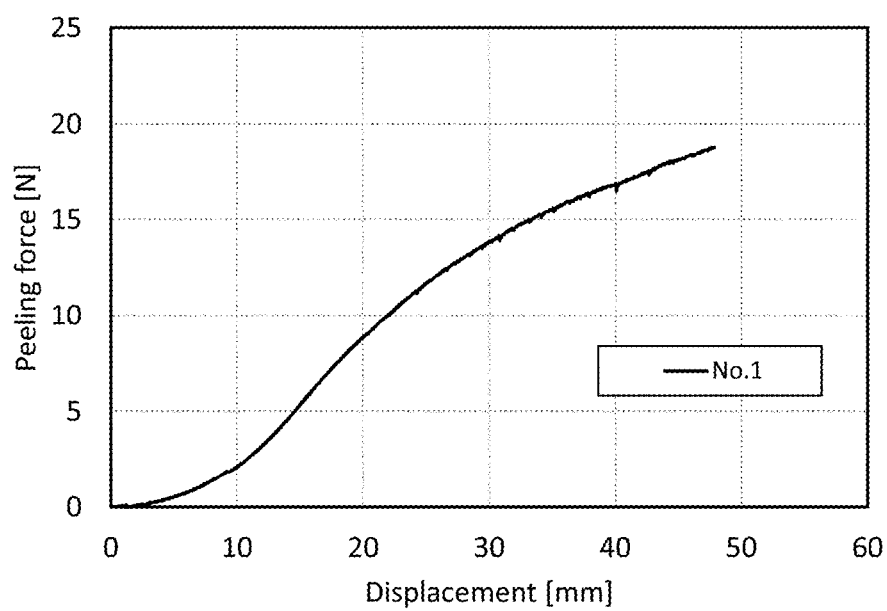

COMPOSITE TYPE HEAT INSULATOR AND METHOD FOR PRODUCING THE SAME

TECHNICAL FIELD

The present invention relates to a composite type heat insulator comprising a sandwiched body in which silica aerogel is sandwiched between silica fibrous cloths, and to a method for producing the same.

BACKGROUND

Exhaust systems for gasoline vehicles or diesel vehicles are required to convert air pollutants (hydrocarbons, NOx, CO, $N_2O$, etc.) in their exhaust gas into harmless $N_2$ and/or oxygen before exhausting. For this reason, a catalytic converter catalyzing the oxidation-reduction reaction of the exhaust gas is equipped downstream of the exhaust manifold.

As illustrated in FIG. 1, a typical catalytic converter 1 comprises a honeycomb-shaped ceramic catalytic carrier 3 housed in a casing 2 made of stainless steel, and a heat insulating material 4 filled in a space between the casing 2 and the catalytic carrier 3. The exhaust gas is purified while passing through the holes of the honeycomb-shaped catalytic carrier 3 by contact with the catalyst carried therewith.

The heat insulating material 4 has roles such as a protector of the ceramic carrier from external vibrations and shocks; an absorber of the difference in thermal expansion between the ceramic carrier and the stainless steel casing; a positioner of the catalytic carrier; and an insulator for peripheral equipment from high-temperature exhaust gas. Inorganic fiber lumps such as glass wool and rock wool are commonly employed for a heat insulating material (disclosed in, for example, paragraph 0009 of JP 2018-168806A).

Besides glass wool and rock wool, a composite type holder surrounding a catalytic converter in which an insulating part and a holder part are wet-laid and combined is suggested in JP 2013-024214A. The holder part is made of a first fiber selected from alumina fiber, mulite fiber, aluminosilicate fiber, silica fiber, soluble fiber, or a mixture thereof. The insulating part is made of a second fiber selected from glass fiber, rock wool, aluminosilicate fiber, silica fiber, a soluble fiber or a mixture thereof.

Further, a mat made of physically entangled inorganic sol-gel fibers in a form of sheet is suggested in JP 2013-514496A, as a mat to be mounted between the casing and the ceramic catalytic carrier. This mat is formed by wet-forming a layer of stabilized sol-gel inorganic fibers and entangling the inorganic fibers each other by needling, and then calcining.

PRIOR ART

Patent Document

Patent Document1: JP 2018-168806A
Patent Document2: JP 2013-024214A
Patent Document3: JP 2013-514996A

SUMMARY OF THE INVENTION

Technical Problem to be Solved by the Invention

By the way, a three-way catalyst which simultaneously catalyzes redox and decomposition reaction is usually employed for a purification catalyst carried on a catalytic converter. Since the moderate temperature of the three-way catalytic reaction ranges from about 400 to about 700° C., the temperature of the catalytic carrier should be kept within the temperature range for advanced purification of exhaust gas.

In this respect, the catalytic converter can work effectively because the exhaust gas has a temperature of 500° C. or more during running of the vehicle. However, the exhaust gas temperature is low at an early stage of running or when warming-up. Therefore, a catalytic carrier needs to raise its temperature rapidly. In particular, in order to respond the exhaust gas regulations which became stringent in recent years, a decline in temperature due to heat dissipation of the casing should be stopped quickly at an early stage of running, and the purification catalyst should work immediately after restarting from a temporal stop of the vehicle.

In order to satisfy the requirement, a catalytic carrier heated to a high temperature needs to retain the temperature even when the vehicle temporarily stops. In other words, it is necessary to suppress a temperature decline of the catalytic carrier and isolate the catalytic carrier from the environment in an atmospheric temperature with an excellent heat insulating performance. Therefore, a heat insulator mounted around the catalytic carrier is required to have a heat insulating performance meeting these requirements.

If a mat or blanket made of glass fiber, rock wool, silica fiber or alumina fiber is used as a heat insulating material filled in the catalytic converter, the mat or blanket should have a thickness greater than 2 cm for obtaining a necessary heat insulating performance (heat retention effect). However, such a thick insulator is not practical because of the dimensional limitations of the casing and/or the catalytic carrier.

The present invention has been made under these circumstances, and an object of the present invention is to provide a composite type heat insulator capable of exhibiting a desirable heat insulating performance even with a thickness in the range of about 3 to 18 mm, and a method for producing the same.

Means for Solving the Problem

The composite type heat insulator of the present invention comprises a first cloth and a second cloth, and a heat insulating layer interposed between the first cloth and the second cloth. The first and second cloths comprise a plurality of silica fibers having a hydroxyl group. The heat insulating layer contains silica aerogel and a plurality of silica staple fibers having a length in the range from 0.5 to 5 mm.

The heat insulating layer may further contain an infrared absorber.

According to one aspect of the invention, the heat insulating layer contains silica aerogel and a plurality of silica staple fibers having a length of 0.5 to 5 mm, in an amount ratio of the silica staple fiber to the silica aerogel (silica staple fibers:silica aerogel) ranging from 8:2 to 2:8 in weight, while the silica aerogel is held by the silica staple fibers.

In another aspect of the invention, the heat insulating layer contains silica aerogel and a plurality of silica staple fibers having a length of 0.5 to 5 mm, and a film-forming inorganic binder. The amount ratio of the silica staple fiber to silica aerogel (silica staple fibers:silica aerogel) is in the range from 1:1 to 1:35 in weight.

According to a certain embodiment of the invention, the heat insulating layer may be a layered structure including two or more heat insulating layers differing in its composition.

According to a certain embodiment in the case of the heat insulating layer having a layered structure, an infrared absorber layer containing no silica staple fiber is further interposed between the first cloth and the second cloth, and the infrared absorber layer is jointed to the heat insulating layer.

In another aspect of the composite type heat insulator, the heat insulating layer has a layered structure including a first heat insulating layer (I) and a second heat insulating layer (II).

The first heat insulating layer (I) contains:
  either (i) silica aerogel and a plurality of silica staple fibers having a fiber length of 0.5 to 5 mm, in an amount ratio of the silica staple fiber to the silica aerogel ranging from 8:2 to 2:8 in weight; or (ii) silica aerogel, a plurality of silica staple fibers having a fiber length of 0.5 to 5 mm, and a film-forming inorganic binder, in an amount ratio of the silica staple fiber to the silica aerogel ranging from 1:1 to 1:35 in weight.

The second heat insulating layer (II) contains silica staple fiber having a fiber length of 0.5 to 5 mm, silica aerogel, and an infrared absorber.

In another aspect of the composite type heat insulator, the heat insulating layer has a layered structure including a first heat insulating layer (I) and a third heat insulating layer (III). The first heat insulating layer contains:
  either (i) silica aerogel and a plurality of silica staple fibers having a fiber length of 0.5 to 5 mm in an amount ratio of the silica staple fiber to the silica aerogel ranging from 8:2 to 2:8 in weight; or (ii) silica aerogel, a plurality of silica staple fibers having a fiber length of 0.5 to 5 mm, and a film-forming inorganic binder, in an amount ratio of the silica staple fiber to the silica aerogel ranging from 1:1 to 1:35 in weight.

The third heat insulating layer (III) contains a plurality of silica staple fibers having a fiber length of 0.5 to 5 mm and an infrared absorber.

According to the invention, it is preferable that at least a portion of the silica staple fiber is jointed to other silica staple fiber and/or the silica fiber through a siloxane bond.

According to a method for producing a composite type heat insulator of the invention, the method comprises heating a sandwiched body at a temperature of 300 to 700° C. in a pressurized condition. In the sandwiched body, a silica aerogel, a plurality of silica staple fibers having a hydroxyl group, and optionally an infrared absorber are sandwiched between a first cloth and a second cloth, wherein the first and the second cloths comprise a plurality of silica fibers having a hydroxyl group.

The sandwiched body may be prepared by applying a solvent-free mixture of the silica aerogel, the plurality of silica staple fibers having a hydroxyl group, and the infrared absorber on the first cloth, and subsequently superposing the second cloth on the solvent-free mixture-applied surface. Alternatively, the sandwiched body may be prepared by applying a dispersion liquid on the first cloth, and subsequently superposing the second cloth on the dispersion liquid-applied first cloth. The dispersion liquid contains silica aerogel, a plurality of silica staple fibers having a hydroxyl group, and optionally an infrared absorber in a dispersion medium.

In the case that the heat insulating layer contains a film-forming inorganic binder, the method for producing a composite type heat insulator of the invention comprises:
  preparing a dispersion liquid by dispersing silica aerogel, a film-forming inorganic binder, and silica staple fibers having a hydroxyl group, and optionally an infrared absorber in a dispersion medium;
  applying the dispersion liquid on a first cloth comprising a plurality of the silica fibers having a hydroxyl group, and subsequently superposing the second cloth comprising a plurality of the silica fibers having a hydroxyl group, thereby obtaining a sandwiched body in which a mixture of the silica aerogel, the film-forming inorganic binder, and the silica staple fibers having a hydroxyl group, and optionally the infrared absorber, are sandwiched between the first cloth and the second cloth;
  heating the sandwiched body at a temperature in the range of 300 to 700° C. in a pressurized condition.

In the case that a heat insulating layer has a layered structure, a method for producing a composite type heat insulator employs either a combination of the following first mixture layer (I) and second mixture layer (II) or a combination of the following first mixture layer (I) and third mixture layer (III), as the layer interposed between the first cloth and the second cloth.

The first mixture layer (I) is either a mixture layer containing silica staple fibers and silica aerogel, or a mixture layer containing silica staple fibers, silica aerogel and a film-forming inorganic binder.

The second mixture layer (II) is a mixture layer containing silica staple fibers, silica aerogel and infrared absorber.

The third mixture layer (III) is a mixture layer containing silica staple fibers and an infrared absorber.

Effect of the Invention

In a composite type heat insulator of the invention, the silica aerogel can be stably supported between a first and second silica fibrous cloths while the silica aerogel still sustains its porosity. Therefore, the composite type heat insulator has an excellent heat resistance and heat insulating properties. Moreover, the silica staple fibers for holding the silica aerogel particles may also increase physical strength of the heat insulating layer containing the silica aerogel particles, and therefore the composite type heat insulator is also excellent in durability such as shape retention.

In addition, when the infrared absorber is included in the heat insulating layer, the composite type heat insulator is excellent in retaining heat energy of the heat source.

The composite type heat insulator of the invention can be manufactured easily and stably by a producing method of the present invention.

BRIEF DESCRIPTION OF THE DRAWINGS

FIG. 1 is a schematic cross-sectional view showing the structure of a catalytic converter used in an automobile.

FIG. 2 is a schematic view showing the configuration of the composite type heat insulator according to the first embodiment of the invention.

FIG. 3 is a schematic view showing the configuration of the composite type heat insulator according to the second embodiment of the invention.

FIG. 4 is a schematic view showing the configuration of the composite type heat insulator according to the third embodiment of the invention.

FIG. 5 is a schematic view showing the configuration of the composite type heat insulator according to the fourth embodiment of the invention.

FIG. 6 is a schematic view showing the configuration of the composite type heat insulator according to the fifth embodiment of the invention.

FIG. 7 is a schematic view showing the configuration of the heat insulator of Reference Example 2.

FIG. 8 is a graph showing thermal conductivity test results of composite type heat insulator Nos. 1 to 4, and Reference Example 1.

FIG. 9 is a graph showing thermal conductivity test results of composite type heat insulator Nos. 3 and 5, and Reference Examples 1 and 2.

FIG. 10 is a schematic view for explaining a bending stress test results.

FIG. 11 is a graph showing bending stress test results of composite type heat insulator No. 3 and Reference Example 2.

FIG. 12 is a graph showing a bending stress test results of composite type heat insulator Nos. 1 and 5, and Reference Example 4.

FIG. 13 is an electron micrograph of the cut surface of the composite type heat insulator No. 1.

FIG. 14 is an electron micrograph of the cut surface of the composite type heat insulator No. 3.

FIG. 15 is a chart showing peeling test results of No. 5 and Reference Example 4.

FIG. 16 is an optical micrograph and a three-dimensional image of the joint interface of No. 5.

FIG. 17 is an optical micrograph and a three-dimensional image of the joint interface of Reference Example 4.

FIG. 18 is a chart showing peeling test result of No. 1.

EMBODIMENT FOR CARRYING OUT THE INVENTION

[Method for Producing a Composite Type Heat Insulator]

A method for producing a composite type heat insulator of the invention comprises heating a sandwiched body at a temperature of 300 to 700° C. in a pressurized condition. The sandwiched body comprises a silica aerogel, a plurality of silica staple fibers having a hydroxyl group, and a first and a second cloths between which said insulating material and said silica staple fibers are interposed. Each of the first and second cloths is a fibrous cloth of silica fibers having a hydroxyl group. The insulating material include a silica aerogel, and may also include an infrared absorber if necessary.

(1) Silica Fibrous Cloth

A cloth of silica fibers having a hydroxyl group, which is hereinafter simply referred to as "silica fibrous cloth", is used for a first and second cloth. The silica fibrous cloth is a sheet such as woven fabric, knitted fabric, or non-woven fabric, felt, mat, or blanket, composed of a plurality of silica fibers.

The silica fiber having a hydroxyl group, which is a constituent fiber of the cloth, contains at least 81% by weight $SiO_2$. Si(OH) is present in a part of SiO— network. The silica fibers can joint with each other upon calcination through siloxane bond by dehydration condensation as shown in the formula (1) below.

[Chemical formula 1]

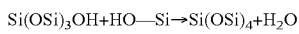

(1)

Any silica fiber containing Si(OH) may be used for a constituent fiber of the cloth. Without limitation, exemplary composition of the silica fiber include $AlO_{1.5} \cdot 18[(SiO_2)_{0.6}(SiO_{1.5}OH)_{0.4}]$.

A typical silica fiber has the following composition:
$SiO_2$: 81-97% by weight;
$Al_2O_3$: 3-19% by weight; and
A component selected from the group consisting of $ZrO_2$, $TiO_2$, $Na_2O$, $Li_2O$, $K_2O$, CaO, MgO, SrO, BaO, $Y_2O_3$, $La_2O_3$, $Fe_2O_3$ and a mixture thereof (referred to as "other component"): 2% by weight or less.

Specifically, the silica fiber may be produced by:
melting a starting glass substance having the following composition;
55-80 wt % $SiO_2$,
5-19 wt % $Al_2O_3$,
15-26 wt % $Na_2O$,
0-12 wt % $ZrO_2$,
0-12 wt % $TiO_2$, and
up to 1.5 wt % $Li_2O$, $K_2O$, CaO, MgO, SrO, BaO, $Y_2O_3$, $La_2O_3$, $Fe_2O_3$ and mixtures thereof;
forming filaments from the melt;
extracting the resulting filament with use of acid; and
removing residual acid and/or salt from the extracted filament and then drying.

In the treatment with acid, the alkali metal ion is substituted with a proton, but an ion such as $Al^{3+}$, $TiO^{2+}$ or $Ti^{4+}$, and $ZrO^{2+}$ or $Zr^{4+}$ remains in the Si—O network. A metal ion substituted with proton in the silicon dioxide skeleton depends on its valence and may retain a certain number of hydroxyl groups. Thus remained hydroxyl groups form a new Si—O—Si bond by dehydration condensation represented by the above formula (1) at a temperature of about 300 to 700° C.

The silica fiber constituting the cloth is a filament obtained by melt-spinning a material having the above composition, and has a diameter of 6 to 13 μm, preferably about 7 to 10 μm. The fiber length is not particularly limited, but is preferably from 30 to 150 mm, more preferably 50 to 130 mm from the viewpoint of a cloth formability which is entangling ability of fibers in a sheet composed of a plurality of fibers.

A commercially available silica fiber may be used. For example, BELCOTEX® manufactured by BELCHEM GmbH may be used.

BELCOTEX® fibers are generally made from alumina-modified silicic acid and have an average fineness of about 550 tex in standard type staple fiber pre-yarns. BELCOTEX® fibers are amorphous and typically consist of approximately 94.5 wt % silica, approximately 4.5 wt % alumina, less than 0.5 wt % oxide, and less than 0.5 wt % other components. It has an average diameter of about 9 μm with little variation, a melting point of 1500° C. to 1550° C., and heat resistance up to 1100° C.

Besides BELCOTEX®, any silica fiber having a hydroxyl group may be used.

Not only one type of silica fiber, but also a combination of two or more types of silica fibers differing in fiber diameter or length may be used for a silica fiber constituting the cloth.

The silica fibers are preferably entangled with each other in the cloth. Entanglement of silica fibers may be performed by a conventionally known method such as water flow entanglement or needling of a wet-web or dry-web. Of these, needling is preferable. A needle mat obtained by needling has a stable sheet form with a given thickness and is preferably used.

The thickness of the silica fibrous cloth used as the first and second cloths is not particularly limited, but is in the range of preferably 3 to 25 mm, more preferably 5 to 20 mm. The use of an unduly thin cloth may provide unsatisfactory joint strength to the silica staple fibers interposed between the cloths by the heating and pressurizing operation. A maximum thickness is moderately determined according to a type of catalytic converter on which a composite type heat insulator is mounted, in particular, dimensions for mounting the composite type heat insulator, for instance, a gap size between the catalytic carrier and the casing.

The density of the cloth is in the range of 80 kg/m$^3$ to 180 kg/m$^3$, more preferably 90 kg/m$^3$ to 160 kg/m$^3$. A cloth with unduly high density would not achieve a sufficient integration of the sandwiched body through heating and pressurizing operation. On the other hand, a cloth with unduly low density has large voids corresponding to gaps between fibers in the cloth, the heat insulating materials such as silica aerogel and infrared absorbers, even also silica staple fibers, might be embedded in the voids, resulting in difficulty in the production of a sandwiched body.

(2) Silica Staple Fiber

Silica staple fiber has a role of holding a heat insulating material between the first and second cloths. The silica staple fiber may have an identical composition to silica fibers used as a constituent fiber of the first and second cloths. That is, the silica staple fiber consisting of silica fiber having a hydroxyl group has a composition containing 0.1-20% Al$_2$O$_3$ and 80-99.9% SiO$_2$.

The silica staple fiber has a fiber diameter of 6 to 13 μm, preferably about 7 to 10 μm, and a fiber length of 0.5 mm to 5 mm, preferably 1 to 3 mm. Examples of the silica staple fibers include staple fibers of BELCOTEX® filament.

A staple fiber having a relatively long length is readily to lie along the surface direction of the mat, and as a result, its holding capacity for the heat insulating material becomes insufficient. Moreover, such relatively long fibers are likely to be entangled with each other, which makes their disentanglement difficult. On the other hand, a staple fiber having a length less than 0.5 mm may be lowered in its holding capacity for the silica aerogel and the infrared absorber due to the dimension relationship between them and the staple fiber.

(3) Insulating Material (3-1) Silica Aerogel

A silica aerogel used in the invention is a silica particle having nano-sized (from about 10 to 50 nm) pores filled with air. The silica aerogel has a porosity of 60% by volume or more, preferably 80% by volume or more, more preferably 90% by volume or more, and has a density of about 0.1 to 0.4 g/cm$^3$. Therefore, the silica aerogel is very light. Additionally, its heat insulating performance may be enhanced due to porosity.

The silica aerogel has a secondary particle size of 10 to 500 μm. However, silica aerogel particles tend to aggregate and may exist as an aggregate having a particle size of 1 to 5 mm. Such aggregate is preferably used after breaking and/or dispersing treatment. Silica aerogel powder after breaking and/or dispersing treatment may have a particle size distribution such that 90% or more falls in the range of 5 μm to 1 mm, more preferably of 10 μm to 500 μm.

A commercially available silica aerogel powder having the above-mentioned particle size distribution as well as silica aerogel powder after appropriately breaking and/or dispersing treatment may be used for the silica aerogel.

A silica aerogel used in the invention is hydrophobic, preferably has a hydrophobic group on the surface. Specifically, a silica aerogel has a trisubstituted silyl group represented by the formula below on the particle surface, resulting in exhibiting hydrophobic. In the formula, R$^1$, R$^2$, and R$^3$ may be the same or different, and are selected from alkyl groups having from 1 to 18 carbon atoms or aryl groups having from 6 to 18 carbon atoms, preferably selected from a methyl group, an ethyl group, a cyclohexyl group, or a phenyl group.

[Chemical formula 2]

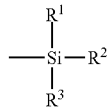

Silica aerogel is usually used in the range of 2:8 to 8:2 in a relative amount of silica aerogel to staple fiber (silica aerogel:staple fiber) in weight. The higher the relative amount of silica aerogel, the higher the heat insulating performance can be obtained. Since the relative amount of silica aerogel becomes higher with a proportional decrease of the staple fiber, the stability of the silica aerogel held between the clothes may be lowered. For these reasons, a sufficient amount of staple fibers for holding silica aerogel is appropriately determined depending on a kind of staple fiber, dimensions of staple fibers (e.g. fiber diameter, fiber length, etc.), presence or absence of film-forming inorganic binder described later, and how to lay silica staple fibers and heat insulating material on the cloth.

When silica staple fiber and heat insulating material are mixed in dry condition (without solvent) and laid over the cloth in the absence of film-forming binder, the weight ratio of aerogel to staple fiber (aerogel:staple fiber) is in the range of 2:8 to 8:2, preferably 2:8 to 5:5, more preferably 3:7 to 4:6 from the viewpoint of stable hold and heat insulating performance.

In addition to the use of film-forming inorganic binder, if staple fibers are disentangled into individual fibers to increase homogeneity in mixing with silica aerogel, the amount of staple fibers can be reduced down to one thirty-fifth amount of the aerogel. In the case that silica staple fibers are sufficiently disentangled in a dispersion medium in advance, preferably dispersed in a form of individual fibers, and then mixed with a heat insulating material, optionally with a film-forming inorganic binder added, the content ratio of silica aerogel to staple fiber (i.e. silica aerogel/staple fiber) in weight, may be 1 or more, 2 or more, 4 or more, 10 or more, but utmost 35 or less, 30 or less, 20 or less, and 10 or less.

The amount of silica aerogel laid over a cloth depends on the configuration of the heat insulating layer, but is allowed to reach about 1.8 kg by square meter of the cloth. From the viewpoint of stability in holding and ease in preparation of mixed heat insulating materials and so on, the amount of silica aerogel is preferably from about 300 g to 1.5 kg, more preferably about 500 g to 1 kg by square meter of the cloth.

(3-2) Infrared Absorber

An infrared absorber can work as a heat insulating material for insulation of a heat source from its surroundings because the infrared absorber can retain heat energy of the heat source.

As an infrared absorber capable of working as a heat insulating material, a ceramic particle having a thermal emissivity of 0.6 to 0.9, preferably 0.65 to 0.85, can be used.

The ceramic particle has an average particle diameter in the range from 0.5 to 4 μm, preferably 1 to 3 μm, and more preferably 1 to 2.5 μm as measured by a light scattering method. Further, the ceramic particles have a particle size distribution 10 μm or less, preferably 8 μm or less, and more preferably 7 μm or less as the cumulative 90% diameter ($D_{90}$). Ceramic particles with above-mentioned size range may absorb infrared rays, especially near-infrared rays, and then emit them. Therefore, the infrared absorber may work as an effective heat insulating material for keeping temperatures as high as a range of 400 to 900° C., preferably 500 to 900° C., where the rate of radiant heat is relatively high and predominant. Accordingly, the infrared absorber is advantageous in heat retaining effect in such high temperature range, because silica aerogel exhibiting heat insulating performance based on pores is lowered in such high temperature range.

Since the infrared absorber is usually positioned close to the heat source, a suitable ceramic particle used as the infrared absorber is resistant to oxidization and hardly melt even under exposure to a high temperature for a long time period. The preferable ceramic particles include carbides, nitrides and borides, all of which have a melting point of 1500° C. or higher.

Examples of the ceramics usable as an infrared absorber include carbides such as WC, TiC, SiC, and ZrC; nitrides such as TiN, ZrN, and TaN; borides such as CrB, $VB_2$, $W_2B_5$, WB, TaB, and MoB; silicic such as TiSi, ZrSi, and WSi. In general, these ceramic particles have a melting point of 1500° C. or higher, in particular, carbides, nitrides, and borides have a melting point of 2000° C. or higher. Employment of these ceramics enables a heat insulator to use at a high temperature based on heat resistance of the cloth. Of these, carbides of silicon are preferable, and SiC is more preferable, from the viewpoint of affinity with silica staple fibers.

Such an infrared absorber is usually in a form of particles or powder and readily aggregates. When the aggregate is pressurized, it would solidify to form an agglomerate having a particle diameter of about 100 to 500 μm.

When the infrared absorber is used in combination with silica staple fibers, the infrared absorber can be held in the gaps between the silica staple fibers, which is similar to silica aerogel. Although an agglomerate of the infrared absorber commonly has a tendency to lower adhesion to the silica fibrous cloth, the agglomerate can be kept on the cloth in the case of use in combination with a binder or silica staple fibers.

The content of the infrared absorber is not particularly limited, but when a heat insulating layer contains not only infrared absorber but also silica aerogel, the content ratio of silica staple fiber to infrared absorber, silica staple fiber:infrared absorber, is in the range of preferably 9:1 to 5:5, more preferably 9:1 to 6:4, and further 9:1 to 7:3 in weight. Further, in order to stably hold both of the silica aerogel and the infrared absorber with the silica staple fibers, the ratio of silica staple fibers to total amount of the silica aerogel and the infrared absorber, i.e. silica staple fibers:(total amount of the silica aerogel and the infrared absorber), is in the range of 9:1 to 1:9, preferably 9:1 to 2:8, more preferably 9:1 to 4:6, further 8:2 to 5:5, and more preferably 7:3 to 5:5 in weight.

(4) Film-Forming Inorganic Binder

According to the invention, a heat insulating materials are supported by silica staple fibers in the composite type heat insulator. However, a film-forming inorganic binder may be further contained as a constituent component of the heat insulating layer.

A film-forming inorganic binder is a dispersion liquid (slurry) containing a layered silicate as a main component. The layered silicate is in the form of two-dimensionally flat layer by connecting tetrahedrons of $SiO_2$ with three edge-sharing oxygen atoms. Examples of the metal constituting the silicate include aluminum, potassium, sodium, calcium and magnesium.

As the layered silicate, sodium silicate represented by $xNa_2 \cdot ySiO_2$ (y/x=2 to 3) is preferable. Examples of the sodium silicate include smectite (e.g. saponite, hectorite, stephensite, montmorillonite), and permiculite clay minerals, preferably smectites.

A synthesized layered silicate as well as a natural mineral including smectite-based mineral or permiculite-based mineral, or bentonite containing said mineral as a main component may be used for the film-forming inorganic binder. Such layered silicate absorbs water to swell and form into a film by drying.

The film-forming inorganic binder is usually used in a form of slurry containing water, a lower alcohol, or a mixture thereof as a dispersion medium. A solid content in the slurry is usually from 1 to 10% by weight, preferably 3 to 5% by weight, from the viewpoint of its viscosity and ease of handling.

A commercially available film-forming inorganic binder may be used. For example, Kunipia series whose main mineral is montmorillonite, smecton series whose main mineral is saponite, stepnsite, or hectorite, moistonite series whose main mineral is bentonite, all of them are available from Kunimine Industries, Ltd.

The use of film-forming inorganic binder with staple fibers in combination allows to reduce the amount of staple fibers without impairing the stability in supporting the heat insulating material. Additionally, a resulting composite type heat insulator can attain a desirable strength even though the amount of staple fibers is reduced, which is an advantage.

The reduction in the amount of staple fibers while retaining the strength and supporting stability for the heat insulating material is preferred in an application requiring heat insulation in a high temperature region where the heat conduction rate is high. On the other hand, an unduly large amount of the film-forming inorganic binder undesirably increases the viscosity of the slurry, which results in poor handleability and low dispersibility in mixing with a heat insulating material. This limits the method of applying the slurry to the silica fibrous cloth.

When a film-forming binder is used in combination with staple fibers, a preferable amount of the film-forming binder is not greater than a half amount of silica aerogel. Specifically, the relative amount of the film-forming binder to silica aerogel is ½ or less, preferably from ⅓ to ¹⁄₁₀, and more preferably from about ⅓ to ⅛ in weight.

(5) Embodiment of the Sandwiched Body and Preparation of the Same

A mixture of silica staple fibers and a heat insulating material is sandwiched between a said first cloth and a said second cloth.

As for the heat insulating material, silica aerogel and the infrared absorber may be used individually or in combination. A layered structure comprising a layer of a mixture of silica aerogel and silica staple fibers and a layer of a mixture of silica staple fibers and an infrared absorber may also be employed. Silica aerogel can exhibit excellent heat insulating performance mainly in a temperature range of 100 to 500° C. due to hindrance of heat conduction through pores in the silica aerogel. Since the infrared absorber absorbs infrared rays and dissipates heat energy, the infrared absorber can exhibit excellent heat retention at high temperatures of 400° C. or higher, further 450° C. or higher, particularly 500° C. or higher. Therefore, the embodiment of the sandwiched body may be appropriately designed according to the intended use.

According to the embodiments of the sandwiched body, exemplary configuration of the interlayer between the first cloth and the second cloth are below.

a) a layer of mixture of silica staple fiber and silica aerogel;

b) a layer of mixture of silica staple fibers, silica aerogel and infrared absorber;

c) a layered structure composed of a first mixture layer containing silica staple fibers and silica aerogel, and a second mixture layer containing silica staple fibers, silica aerogel, and an infrared absorber.

d) a layered structure composed of a first mixture layer containing silica staple fibers and silica aerogel and a third mixture layer containing silica staple fibers and infrared absorber.

When a film-forming binder is used in combination with the staple fibers, the film-forming binder may be present in gaps created with the silica staple fibers, the silica aerogel, and the infrared absorber in the mixture (layer).

The method of mixing the staple fiber with the silica aerogel and/or the infrared absorber is not particularly limited. The silica staple fibers and the heat insulating material (silica aerogel, infrared absorber) may be put into a container in a given ratio and mixed still in a dry state by stirring, shaking or the like, thereby providing a solvent-free mixture. Alternatively, a heat insulating material in a form of dispersion liquid may be prepared by mixing a heat insulating material with silica staple fibers and dispersing them in a dispersion medium. Examples of the dispersion medium include water, a lower alcohol (e.g. methanol, ethanol, propanol, etc.), an organic solvent such as esters (e.g. acetic acid ester), ketones (e.g. acetone), or a mixed solvent of water and an organic solvent. A surfactant may be added to the dispersion liquid, if necessary. The mixing process using a dispersion medium allows to add a film-forming inorganic binder, which is advantageous.

The staple fibers are preferably disentangled prior to mixing with heat insulating materials. In the case of preparation of a dispersion liquid, staple fibers are disentangled by stirring in a dispersion medium and then a heat insulating material may be added. The entanglement in the dispersion medium can widen the interfiber gaps sufficiently as compared to entanglement with air. Thereby, the heat insulating material can be mixed with the disentangled staple fibers in the dispersion medium. Therefore, a resulting mixture of the staple fibers with the silica aerogel and the infrared absorber may be improved in homogeneity as compared to the solvent-free mixture. This means the amount of staple fibers can be reduced while the silica aerogel and the infrared absorber can be stably supported. In other words, the amounts of supported silica aerogel and the infrared absorber may be increased.

On the other hand, the use of a dispersion medium requires drying process for removing the dispersion medium after applying the insulating material on the surface of the cloth, as described later. In this regard, the solvent-free mixture is advantageous in productivity of the sandwiched body because of unnecessity of a drying process.

A sandwiched body can be obtained by applying the prepared solvent-free mixture or dispersion liquid which is a mixture of staple fibers and heat insulating material, on the surface of the first cloth, and superposing the second cloth on the mixture-applied surface of the first cloth.

In the case of solvent-free mixture, an applying step is carried out by spraying, sprinkling or the like. The mixture on the surface may be spread smoothly with a spatula, a blade, a roller or the like.

In the case of dispersion liquid, an applying step is carried out by spraying or coating with a blade or squeeze and so on, depending on the viscosity and/or solid content of the dispersion liquid. An drying step should be carried out after the applying step so that the dispersion medium is removed. The drying temperature and drying time are appropriately selected according to a type of dispersion medium, a viscosity of the dispersion liquid, and a solid content. In order to shorten the drying time, the sandwiched body may be set in a container having a drain and pressed to discharge the dispersion medium from the sandwiched body.

The sandwiched body may include a layer which contains a heat insulating material but not contain staple fibers. Even if the sandwiched body includes a layer containing heat insulating material alone, a necessary bonding strength could be assured by jointing to a mixture layer containing silica staple fiber and heat insulating material via heating and pressurizing process.

(5) Heating and Pressurizing Process

The obtained sandwiched body is heated and pressurized with use of an apparatus having a heater and press.

The pressure in the pressurizing process is commonly selected from the range of 1 to 15 kN, preferably about 3 to 13 kN, and more preferably about 5 to 10 kN. Unduly large pressure may damage the silica fibers constituting the cloth. On the contrary, unduly small pressure would not attain sufficient adhesion between the heat insulating layer and the cloth. Moreover, the sufficient adhesion between silica staple fibers would not be ensured due to the reduction in a rate of interlocked portions and/or bonded portions per unit volume, resulting in the tendency of unstable support of silica aerogel and infrared absorber particles. Also, the strength of the composite type heat insulator may be lowered.

The heating temperature is selected from the range of 300 to 700° C., preferably 350 to 600° C., and more preferably 400 to 500° C., so that a dehydrocondensation reaction can occur between silica fibers and silica staple fibers through their hydroxyl groups.

The first cloth and the second cloth are jointed and integrated with the heat insulating layer by heating and pressurizing operation. Such joint and integration may be achieved by partial fusion between the silica staple fibers or partial fusion between the silica staple fiber and the surface of the cloth. Such fusion may result from a formation of a siloxane bond in the heating process through dehydrocondensation of the hydroxyl groups contained in the silica fibers with each other.

When a plate-shaped press is used in the pressurizing operation, a plate-shaped composite type heat insulator is produced. Another shape such as hemisphere cylindrical or a box may be imparted on a composite type heat insulator by selecting a press shape according to a desirable shape.

The pressurization time is determined depending on the heating temperature, and may be usually selected from the range of 1 to 3 hours, preferably 1.5 hours to 2.5 hours at a heating temperature of about 300 to 400° C. In the case of heating temperature of 400 to 600° C., the pressurization time is selected from the range of about 5 to 40 minutes, preferably about 10 to 30 minutes. Since a higher heating temperature can shorten the pressurization time, pressurization time and heating temperature may be appropriately selected according to the desired productivity.

<Composite Type Heat Insulator>

The above-mentioned producing method of the invention may provide a composite type heat insulator of the invention. Embodiments of the composite type heat insulator are classified based on the heat insulating material sandwiched between the first cloth and the second cloth.

(1) First Embodiment

FIG. 2 illustrates a composite type heat insulator where silica aerogel particles 7 is solely contained as an insulating material contained in the heat insulating layer 11 sandwiched between the first cloth 5a and the second cloth 5b. The silica aerogel particles 7 are held by the entangled silica staple fibers 6.

A first and second cloths in the composite type heat insulator are compressed compared to the original ones employed in the method for the production of the sandwiched body. The constituent silica fibers of the compressed cloths are the same as those of the respective original cloths.

The kind of cloths such as woven fabrics, non-woven fabrics, mats, felts, or blankets corresponds to that used in the production of a heat insulator.

The first cloth and the second cloth each has a thickness of usually 1 to 8 mm, preferably 3 to 5 mm, depending on the pressurizing force. The bulk density of the cloth is preferably from 100 to 300 kg/m$^3$, more preferably 130 to 270 kg/m$^3$, depending on the pressure.

The silica aerogel particles contained in the heat insulating layer 11 are silica aerogel used in the above-mentioned production of a heat insulator. The porous state of the silica aerogel can be sustained because the silica aerogel particles are not crushed by the pressure force applied in the heating and pressurizing process. Therefore, the produced composite type heat insulator can retain a heat insulating performance inherent in silica aerogel.

The silica staple fibers for holding the silica aerogel have a fiber diameter of 6 to 13 μm, preferably 7 to 10 μm, and a fiber length of 0.5 to 5 mm, preferably 1 to 3 mm. Such silica staple fibers may be bonded each other and further jointed to the cloth at a contact point through a siloxane bond formed by dehydrocondensation of some or all hydroxyl groups contained in the silica staple fibers. The silica aerogel may be supported or held in gaps which are created by entanglement and/or partially joint of the silica staple fibers, and moreover is stably supported between the first cloth and the second cloth.

The content ratio of the silica aerogel 7 to the silica staple fiber 6 is substantially identical to that adopted in a method for the preparation of the sandwiched body.

According to the first embodiment of the composite type heat insulator, the heat insulating layer 11 containing silica aerogel is sandwiched between the silica fibrous cloths 5a and 5b and is integrated to the cloths in the sandwiched state. Since the silica aerogel can retain its porosity even in the heat insulating layer 11, the heat-insulating performance and heat retention inherent in silica aerogel can be exerted. In addition to micropores of the silica aerogel, gaps between the constituent elements in the heat insulating layer 11, such as gap or space between staple fibers, between silica aerogels, or between staple fibers and the heat insulating material, may contribute to heat insulation.

Therefore, the composite type heat insulator of the first embodiment can exert a heat insulating performance as high as the silica fibrous cloth alone does not reach.

(2) Second Embodiment

FIG. 3 shows a certain example of the composite type heat insulator of the second embodiment, in which a mixture of silica aerogel particles 7 and an infrared absorber 8 is employed for a heat insulating material contained in the heat insulating layer 12 sandwiched between the first cloth 5a and the second cloth 5b. Each of the silica aerogel particles 7 and the infrared absorber (ceramic particles) 8 is supported by the silica staple fibers 6.

The composite type heat insulator belonging to the second embodiment can be produced by employing a mixture of silica aerogel, an infrared absorber, and silica staple fibers for a heat insulating layer sandwiched between the first cloth and the second cloth.

The infrared absorber is identical one as used in the method for the preparation of sandwiched body, and therefore a ceramic particle having a thermal emissivity of 0.6 to 0.9, preferably 0.65 to 0.85, may be used. Such infrared absorber exists in the heat insulating layer in a form of an agglomerate having a particle diameter of 100 to 500 μm, preferably having an average particle diameter of 150 to 300 μm as measured by electron microscope observation. The agglomerate is generated in the heating and pressurizing process.

The kind of the first cloth, the second cloth, and the silica aerogel are identical to those used in the first embodiment, and therefore the description about them will be omitted.

The contents of silica aerogel, infrared absorber, and silica staple fiber in the mixture are substantially coincident with the respective contents adopted in the method of the preparation of the sandwiched body.

According to the composite type heat insulator of the second embodiment, silica aerogel and an infrared absorber are employed for the heat insulating material contained in the heat insulating layer 12. The infrared absorber is excellent in heat retention performance at temperatures higher than 500° C. where the radiant heat rate is high in heat transfer. Since the heat insulating effect of transparent silica aerogel is not large at a temperature higher than 500° C., a combination of silica aerogel with an infrared absorber is effective because this combination can exhibit excellent heat insulation within a wide temperature range thanks to the infrared absorber whose compensation of the heat retaining performance in the high temperature range.

(3) Third Embodiment

According to the third embodiment of the invention, the heat insulating layer 13 sandwiched between the first cloth 5a and the second cloth 5b is a layered structure composed of a first heat insulating layer 13a and a second heat insulating layer 13b shown in FIG. 4. The first heat insulating layer 13a consists of a mixture (first mixture) of silica staple fibers 6 and silica aerogel particles 7. The second heat insulating layer 13b consists of a mixture (second mixture) of silica staple fibers 6, silica aerogel particles 7, and infrared absorber (ceramic particles) 8.

The sandwiched body in the composite type heat insulator of the third embodiment can be produced by either (i) applying a first mixture of silica staple fibers and silica aerogel particles on the first cloth, and subsequently applying the second mixture of the silica staple fibers, silica aerogel and infrared absorber, followed by superposing a second cloth; or (ii) applying the second mixture on the second cloth, and subsequently applying the first mixture, followed by superposing a first cloth.

As for the third embodiment of the composite type heat insulator, the infrared absorber can retain heat energy through absorption of infrared rays. Therefore, the composite type heat insulator of the third embodiment is set in a manner that the second heat insulating layer 13b containing the infrared absorber is positioned on the higher temperature side (heat source side). When the catalytic reaction part is insulated, the second heat insulating layer 13b is set as positioned on the catalytic carrier side. Thus the composite type heat insulator can exhibit an excellent heat retention.

(4) Fourth Embodiment

FIG. 5 shows as an example of the fourth embodiment of the composite type heat insulator, in which the heat insulating layer 14 is sandwiched between the first cloth 5a and the second cloth 5b, has a layered structure comprising a first insulating layer 13a made of a first mixture and a third insulating layer 13c layer made from a third mixture. The first mixture comprises silica staple fibers 6 and silica aerogel particles 7, and the third mixture comprises silica staple fibers 6 and an infrared absorber (ceramic particles) 8.

A sandwiched body in the composite type heat insulator of the fourth embodiment can be prepared by applying the first mixture on the first cloth, and subsequently applying the third mixture, followed by superposing the second cloth; alternatively, by applying the third mixture on the second cloth, and subsequently applying the first mixture, followed by superposing the first cloth.

As for the composite type heat insulator of the fourth embodiment, the infrared absorber retains heat energy through absorption of infrared rays. Therefore, the composite type heat insulator is set in a manner that positions the third heat insulating layer 13c containing the infrared absorber on the higher temperature side or the catalytic carrier side. Thus, the composite type heat insulator could exert an excellent heat retention.

In the composite type heat insulator of the fourth embodiment, the contents of silica staple fibers, silica aerogel, and infrared absorber in each heat insulating layer correspond to the respective contents adopted in the method for producing the composite type heat insulator.

According to each of the first through fourth embodiments, the heat insulating layer sandwiched between the first cloth and the second cloth contains silica staple fibers. In addition, a thin layer containing no silica staple fibers may be interposed between the first and second cloths, if the thin layer is integrated in the entire of the resulting composite type heat insulator, which is a fifth embodiment.

When the heat insulating layer is made from a dispersion liquid containing a film-forming inorganic binder, the film-forming binder will intrude into voids of the heat insulating layer. These voids are distinguished from pores of the silica aerogel because the film-forming binder may not be intruded into the pores.

The film-forming inorganic binder can contribute to stable holding for the heat insulating material, in particular, the silica aerogel. The film-forming inorganic binder can be considered as a cause to decrease heat insulation due to its heat conduction. However, the use of the film-forming inorganic binder can reduce the amount of silica staple fibers which conduct heat energy in the thickness direction of the heat insulator. As a result, the heat insulating performance may be enhanced as a whole.

The inventive composite type heat insulator having an above-mentioned structure can adjust the heat insulating performance, hardness, and stiffness by selecting thickness and/or configuration of the heat insulating layer. The heat insulating performance of the composite type heat insulator commonly varies with thickness in the case that a composition of heat insulating material and a configuration of the heat insulating layer are fixed. Therefore, the thickness and configuration of the heat insulating layer may be appropriately selected according to the intended use.

[Application of Composite Type Heat Insulator]

The composite type heat insulator of the invention is excellent in heat insulating performance as well as heat resistance. Therefore, the composition type heat insulator can be preferably used for applications requiring insulation from high temperatures with a relatively thin body. Without limitation, it can be preferably used as a heat insulator to be mounted on a catalytic converter of an automobile. When keeping a high temperatures of a heated device or isolating a device having high temperatures from its peripheral equipment having a considerable difference in temperature, the composition type heat insulator of the invention can be suitably used for heat insulation.

EXAMPLES

[Production of Composite Type Heat Insulator]
(1) Materials
(1-1) First Cloth and Second Cloth A technical needle mat "isoTHERM® BCT" (Frenzelit GmbH) was used as a first and a second cloths.

This needle mat is made from fibers "BELCOTEX® 110 (composition: $AlO_{1.5} \cdot 18[(SiO_2)_{0.6}(SiO_{1.5}OH)_{0.4}]$, fiber diameter: 9 μm)" (BELCHEM GmbH) by needling. The mat has a thickness of nominally 6 mm.

(1-2) Staple Fiber

Staple fibers each having a fiber diameter of 9 μm and average fiber length of 3 mm, which is obtained from cutting the filament "BELCOTEX® 110 (composition: $AlO_{1.5} \cdot 18[(SiO_2)_{0.6}(SiO_{1.5}OH)_{0.4}]$)" (BELCHEM GmbH), was used.

(1-3) Silica Aerogel

A silica aerogel aggregate having a diameter of 1.2 to 4.0 mm (available from CABOT) was broken into individual silica aerogel particles with a mixer. The silica aerogel after broken into pieces has a particle size of 10 to 400 μm according to the measurement with a laser diffraction/scattering particle size distribution analyzer LA-920 (manufactured by Horiba Ltd., dispersion: ethanol).

(1-4) Infrared Absorber

SiC powder available from Nippon Keikal Co., Ltd., which has 1.8 μm ($D_{50}$) and 6.8 μm ($D_{90}$) in a particle size distribution measured by the light scattering analysis, was used. The emissivity of this SiC powder is around 0.82.

(1-5) Film-Forming Inorganic Binder

A purified bentonite "Kunipia F" from Kunimine Industries, Ltd., which was an aqueous dispersion having a solid content of 4%, was used for the film-forming inorganic binder. This aqueous dispersion contained montmorillonite powder and had a viscosity of 30 mPa·s in 4% dispersion.

(2) Production of Heat Insulator
Composite Type Heat Insulator No. 1:

The said entangled staple fibers were put in a container and disentangled by air-blowing. Next, silica aerogel was added. The amount ratio of the staple fiber to the silica aerogel was 4:3 in weight. The resulting mixture was stirred with a mill to prepare a first mixture of insulating materials for a heat insulating layer.

The first mixture prepared above was applied by spraying over a needle mat with 150 mm long, 150 mm wide and 6 mm thick. The sprayed amount was 0.16 g/cm$^2$. Another needle mat was superposed on the first mixture-sprayed surface to provide a sandwiched body.

Thus prepared sandwiched body was set in a press machine and heated at 350° C. for 2 hours while being compressed in the vertical direction of the cloth with a press of 10 kN. Thus produced was a composite type heat insulator No. 1, which belongs to a first embodiment. The obtained composite type heat insulator had a thickness of 8 mm.

Composite Type Heat Insulator No. 2:

A mixture of silica aerogel and infrared absorber having a silica aerogel-to-infrared absorber ratio of 15:4 in weight was used as a heat insulating material. A second mixture of silica staple fibers and the heat insulating material having silica staple fibers-to-heat insulating material ratio of 20:19 in weight was applied on a needle mat by a spraying method. The sprayed amount was 0.17 g/cm$^2$. Thereafter, another needle mat was superposed over the second mixture-sprayed surface to provide a sandwiched body.

The sandwiched body was used to produce a composite type heat insulator No. 2 in the same manner as No. 1. Thus produced composite type heat insulator No. 2 belongs to a second embodiment and had a thickness of 8 mm.

Composite Type Heat Insulator No. 3:

The second mixture prepared for the composite type heat insulator No. 2 was applied on a needle mat by a spraying method in an amount of 0.17 g/cm$^2$, and subsequently the first mixture prepared for the composite type heat insulator No. 1 was applied on the second mixture layer. The sprayed amount of the first mixture was 0.16 g/cm$^2$. Another needle mat was superposed over the first mixture layer to provide a sandwiched body.

Thus prepared sandwiched body was compressed, and heated under the pressurized condition in the same manner as the production of No. 1 to produce a composite type heat insulator No. 3 which belongs to a third embodiment. Thus produced composite type heat insulator No. 3 had a thickness of 10 mm.

Composite Type Heat Insulating Material No. 4:

An infrared absorber was spread over a needle mat to form an infrared absorber layer. The first mixture prepared for the composite type heat insulator No. 1 was applied on the infrared absorber layer in an amount of 0.16 g/cm$^2$. Another needle mat was superposed over the first mixture layer to provide a sandwiched body.

Thus prepared sandwiched body was compressed and then heated under the pressurized condition in the same manner as the production of No. 1. Thus the composite type heat insulator No. 4 belongs to a fifth embodiment having the configuration shown in FIG. 6. The composite type heat insulator No. 4 had a thickness of 8 mm. The infrared absorber layer was composed of SiC agglomerates, which was insufficient in adhesion to the needle mat. For this reason, provided was an insufficiently interlocked or integrated composite type heat insulator which was difficulty in a practical use.

Composite Type Heat Insulator No. 5:

A nonionic surfactant (4% aqueous solution) 55 g was put in a container containing 960 g of water, and then silica staple fibers 6 g were added, followed by stirring to disentangle the staple fibers capable of dispersing individually. Next, SiC powder 67 g was admixed and stirred, and then an anionic surfactant (4% aqueous solution) 11 g was further added. Subsequently, silica aerogel 183 g and a film-forming inorganic binder 54 g were added and stirred to prepare a slurry for a heat insulating layer. The slurry for the heat insulating layer has a content ratio of the silica staple fiber-to-silica aerogel of 1:30 in weight. The solid content of silica aerogel in the slurry was around 60% by weight.

A needle mat with 150 mm long, 150 mm wide and 6 mm thick was used as a first cloth. The prepared slurry for the heat insulating layer was applied with a squeezer so as to become a layer having a thickness of 10 mm. The coating amount was about 0.16 g/cm$^2$.

After the application, the second cloth was superposed and dried by leaving at 74° C. for 24 hours, 90° C. for one hour, and 130° C. for one hour to prepare a sandwiched body.

The sandwiched body was set on a press machine and heated under a pressurized condition in the same manner as the production of No. 1. Thus prepared composite type heat insulator No. 5 had a same configuration as that of the first embodiment, and had a thickness of 8 mm.

Reference Example 1

Six needle mats, each of which was identical one used as a first or second cloth, were stacked and compressed at 350° C. for 2 hours under a pressure of 10 kN to prepare a heat insulator composed of silica fibers alone. This heat insulator had a thickness of 8 mm.

Reference Example 2

A needle mat which was calcined at 800° C. and shrunk mainly in its plane direction was used as a first or second cloths. Calcium silicate instead of the staple fibers for the heat insulator No. 5 was added to prepare the slurry for the reference example 2. Thus prepared slurry was applied to the mat surface using a squeezer.

The slurry-applied mat was bent to be piled up, thereby obtaining a layered body (10.5 mm thick) in which a heat insulating material was sandwiched between the cloth as shown in FIG. 7. This layered body was pressurized with 10 kN for removing water from the layered body. Thereafter, the layered body was dried in a drying oven at 74° C. for 24 hours, 90° C. for one hour, and 130° C. for one hour to prepare a composite type heat insulator. In FIG. 7, the cloth is denoted by 20, and the heat insulating layer containing silica aerogel and the infrared absorber is denoted by 21.

Reference Example 3

The production of a composite type heat insulator in which silica aerogel was solely used as an insulating material for a heat insulating layer was attempted in the absence of staple fibers in the same manner of the production of the composite type heat insulator No. 1.

After heating and pressurizing, the resulting composite type heat insulator could not be taken out from the drying oven because the silica aerogel was spilt. This means the production of the composite type heat insulator of the reference example 3 was substantially impossible.

Reference Example 4

The composite type heat insulator of the reference example 4 was prepared in the same manner as the composite type heat insulator No. 5 except that the slurry for heat insulating layer did not contain a staple fiber.

[Evaluation Method and Results]

<Insulating Performance>

The thermal conductivity of the produced composite type heat insulator Nos. 1 to 4 and Reference Example 1 were measured by a steady heat flow method based on Fourier's law. The thermal conductivity (λ) in the thickness direction of the heat insulator was measured at a temperature within the range of 200 to 700° C. by heating the heat insulator at temperature rise 0.17° C./min. The smaller the thermal conductivity (λ), the more enhanced the heat retention and heat insulation. The composite type heat insulator Nos. 3 and 4 were set in a manner that positioned the layer containing the infrared absorber (SiC) on the high temperature side in the measuring apparatus. The measurement results are shown in FIG. 8.

The thermal conductivity of the produced composite type heat insulator Nos. 3 and 5, and the Reference examples 1 and 2 were also measured. The measurement results are shown in FIG. 9.

As seen from FIG. 8, the composite type heat insulator Nos. 1 to 4 exhibited an enhanced heat insulating performance at a temperature lower than 300° C. as compared with Reference Example 1 (depicted by black circle) which is composed of the only needle mat corresponding to the cloth alone. This enhanced heat insulating performance seems to be given from aerogel. On the other hand, the composite type heat insulator No. 1 (depicted by black triangle) had a higher heat insulation coefficient than the Reference Example 1 in a temperature region above 350° C. The staple fibers seem to impair the heat insulating performance due to its heat conduction in such high temperature region. On the other hand, the composite type heat insulator Nos. 2 to 4, which contained an infrared absorber, could still exhibit excellent insulating performance at high temperatures over 350° C.

As comparing the composite type heat insulator No. 3 (depicted by white triangle) with No. 5 (depicted by white circle) in FIG. 9, No. 5 was superior in heat insulating performance. This may be because No. 5 was improved in dispersion uniformity of the silica aerogel and the infrared absorber due to the employment of dispersion liquid method, or because No. 5 was smaller than No. 3 in an amount of staple fibers.

As seen from FIG. 9, the composite type heat insulator (Reference example 2 depicted by black square) which did not contain silica staple fibers was highest in heat insulating performance. This may be probably due to no staple fibers. However, No. 5 containing silica staple fibers in the heat insulating layer in a reduced amount by use of the dispersion liquid method, could exhibit heat insulating performance almost similar to Reference Example 2 containing no silica staple fibers, even at high temperatures over 350° C.

<Bending Stress>

The bending stress of the composite type heat insulator was evaluated by applying a load as shown in FIG. 10(A) and measuring the load with respect to the displacement d (mm) shown in FIG. 10(B) with use of a bending tester (EZtest manufactured by Shimadzu Corporation).

FIG. 11 shows the measurement results of the composite heat insulator No 3 (solid line) and Reference Example 2 (dash-dot-dash line). FIG. 12 shows the measurement results of the composite heat insulator No. 1 (dash-dot-dash line), No. 5 (solid line), and Reference Example 4 (broken line).

As can be seen from FIG. 11, the composite heat insulator No. 3 containing staple fibers in the heat insulating layer exhibited much larger bending stress than the Reference Example 2 despite that the No. 3 and the Reference Example 2 were compressed to the same extent. This is supposed that No. 3 was enhanced in stiffness and strength by going through the heating and pressurizing process.

As can be seen from the comparison of bending stress between the composite type heat insulator No. 5 and Reference Example 4 in FIG. 12, the bending stress of No. 5 was increased up to 2.5 times or more than of Reference Example 4. Moreover, their heat insulating layers were formed with use of the same dispersion liquid except the presence or absence of staple fibers. From these facts, it was confirmed that staple fibers contained in the heat insulating layer can enhance the stiffness and strength of the composite type heat insulator.

Furthermore, it was confirmed in FIG. 12 that the bending stress of No. 5 was higher than that of No. 1. It was surprising that No. 5 whose heat insulating layer was formed by the dispersion liquid method had a higher stiffness than No. 1 despite that the amount of staple fibers contained in the heat insulating layer of No. 1 is 30 times or more than No. 5. This result is supposed due to that staple fibers could be sufficiently disentangled in the dispersion liquid and the mixing uniformity of silica aerogel with SiC could be improved. Because these would assure holding stability of silica aerogel and SiC even if the amount of staple fibers was reduced owing to the use of film-forming binder in combination.

Referring to FIG. 11, the bending stress of Reference Example 2 was significantly lower than that of Reference Example 4. Although a film-forming inorganic binder was contained in both examples, the stiffness of Reference Example 2 could not be enhanced. This result may be caused from that the fusion through siloxane bond between entangled silica fibers could not be generated in Reference Example 2 by a pressurizing process merely for extracting water at atmospheric temperature.

Composite type heat insulator Nos. 1 and 3 were cut in their thickness direction, and the cut cross sections were observed under an electron microscope. The obtained micrographs are shown in FIG. 13 (No. 1) and FIG. 14 (No. 3). From the micrographs, it can be seen that the spherical silica aerogel particles and the infrared absorber are supported by the silica staple fibers. Further, from FIG. 14, the infrared absorber in a form of agglomerate was supported by silica staple fibers. In FIG. 14, the portion encircled with the solid line may be recognized as SiC agglomerate.

<Adhesion Between Cloth and Heat Insulating Layer>

With respect to each of the composite type heat insulators No. 5 and Reference Example 4, its strip-shaped test piece with 30 mm wide and 150 mm long was prepared.

A peeling test was conducted with a peel tester by chucking both ends of the first and second cloths of the prepared test piece and pulling the both ends at a rate of 5 mm/min.

FIG. 15 shows a relationship between the peeling force and displacement of each test piece. It was seen that No. 5 (solid line) containing staple fibers was about 20% larger than Reference Example 4 (broken line) in peeling force.

With respect to the composite type heat insulators No. 5 and Reference Example 4, the interface between the cloth and the heat insulating layer was observed using a microscope "VHX-7000" from KEYENCE. The obtained micrographs and three-dimensional images of the interface are shown in FIG. 16 (No. 5) and FIG. 17 (Reference Example 4).

Some gaps were present at the interface in Reference Example 4, whereas a noticeable gap was not present in No. 5. This means that No. 5 achieved integration at its joint interface. The staple fibers could contribute to not only holding silica aerogel but also joint and integration with the cloth.

Furthermore, the peeling test result of No. 1 is shown in FIG. 18. No. 1 did not contain SiC but contained staple fibers in amount about 20 times as much as No. 5. As a result, the peel force of No. 1 was 30 times or more than that of No. 5.

INDUSTRIAL APPLICABILITY

The composite type heat insulator of the invention has excellent heat insulating properties as compared to a conventional mat made of heat-resistant inorganic fibers. Therefore, it is useful for a device requiring a high heat insulation with use of a heat insulator as thin as about 3 to 18 mm. Further, if this heat insulator is used for rendering a device in a high temperature, thermal energy for retaining the high temperature would be saved.

DESCRIPTION OF CODE

1: catalytic converter
2: casing
3: honeycomb-shaped catalytic carrier
4: heat insulating material
5a and 5b: cloth
6: silica staple fiber
7: silica aerogel particles
8: infrared absorber (ceramic particles)
11, 12, 13, 14, and 15: insulating layer

The invention claimed is:

1. A composite heat insulator comprising
a first cloth, a second cloth, and a heat insulating layer interposed between the first cloth and the second cloth, the first cloth being in direct contact with the heat insulating layer and the second cloth being in direct contact with the heat insulating layer,
wherein the first and second cloths comprise a plurality of silica fibers having a hydroxyl group,
wherein the heat insulating layer contains silica aerogel and a plurality of silica staple fibers each having a length in the range from 0.5 to 5 mm,
wherein the amount ratio of the silica staple fiber to the silica aerogel (silica staple fiber:silica aerogel) is in the range from 8:2 to 5:5 in weight in the absence of a film-forming binder, and
wherein the silica aerogel is held by the silica staple fibers.

2. The composite heat insulator according to claim 1, further comprising an infrared absorber in a form of particle or powder.

3. The composite heat insulator according to claim 1, wherein the heat insulating layer has a layered structure comprising a first heat insulating layer (I) and a second heat insulating layer (II),
wherein the first heat insulating layer (I) contains silica aerogel and silica staple fibers each having a fiber length of 0.5 to 5 mm, in an amount ratio of the silica staple fiber to the silica aerogel ranging from 8:2 to 5:5 in weight; and
wherein the second heat insulating layer (II) contains a silica aerogel, silica staple fibers having a fiber length of 0.5 to 5 mm, and an infrared absorber.

4. The method for producing a composite heat insulator claimed in claim 3, the method comprising
preparing a first solvent-free mixture for the first heat insulating layer (I) and a second solvent-free mixture for the second heat mixture layer (II), wherein the first heat insulating layer (I) contains a mixture of silica aerogel and silica staple fibers; and wherein the second heat insulating layer (II) contains a mixture of silica aerogel, infrared absorber, and silica staple fibers, and wherein the amount ratio of the silica staple fiber to the silica aerogel (silica staple fiber:silica aerogel) in each of the first and the second solvent-free mixtures in the range from 8:2 to 5:5 in weight in the absence of a film-forming binder;
applying the first and the second solvent-free mixtures independently on the first cloth, and subsequently superposing the second cloth, thereby obtaining a sandwiched body in which the heat insulating layer having a layered structure comprising the first heat insulating layer (I) and the second heat insulating layer (II); and
heating the sandwiched body at a temperature of 300 to 700° C. in a pressurized condition.

5. The composite heat insulator according to claim 1, wherein the heat insulating layer is a layered structure of a first heat insulating layer (I) and a second heat insulating layer (IIa),
wherein the first heat insulating layer (I) contains silica aerogel and silica staple fibers each having a fiber length of 0.5 to 5 mm in an amount ratio of the silica staple fiber to the silica aerogel ranging from 8:2 to 5:5 in weight; and
wherein the second heat insulating layer (IIa) contains an infrared absorber and silica staple fibers each having a fiber length of 0.5 to 5 mm.

6. The method for producing a composite heat insulator claimed in claim 5, the method comprising
preparing a first solvent-free mixture for the first heat insulating layer (I) and a second solvent-free mixture for the second heat insulating layer (IIa) wherein the first heat insulating layer (I) contains a mixture of silica aerogel and silica staple fibers; and wherein the second heat insulating layer (IIa) contains a mixture of silica staple fibers and infrared absorber, and wherein the amount ratio of the silica staple fiber to the silica aerogel (silica staple fiber:silica aerogel) in each of the first and the second solvent-free mixtures is in the range from 8:2 to 5:5 in weight in the absence of a film-forming binder;
applying the first and the second solvent-free mixtures independently on the first cloth, and subsequently superposing the second cloth, thereby obtaining a sandwiched body in which the heat insulating layer having a layered structure comprising the first heat insulating layer (I) and the second heat insulating layer (IIa); and
heating the sandwiched body at a temperature of 300 to 700° C. in a pressurized condition.

7. The composite heat insulator according to claim 1, wherein one silica staple fiber among the plurality of silica staple fibers in the heat insulating layer is jointed to at least a portion of another silica staple fiber among the plurality of silica staple fibers in the heat insulating layer, or to at least a portion of the silica fiber in the first cloth or second cloth through a siloxane bond.

8. A method for producing the composite heat insulator of claim 2, the method comprising:
applying a solvent-free mixture of the silica aerogel and a plurality of silica staple fibers having a hydroxyl group, and optionally an infrared absorber on a first cloth comprising a plurality of silica fibers having a hydroxyl group;

wherein the amount ratio of the silica staple fiber to the silica aerogel (silica staple fiber:silica aerogel) is in the range from 8:2 to 5:5 in weight in the absence of a film-forming binder;

superposing a second cloth comprising a plurality of silica fibers having a hydroxyl group over the applied solvent-free mixture to prepare a sandwiched body in which the silica aerogel and the silica staple fibers, and optionally the infrared absorber are sandwiched between the first cloth and the second cloth; and heating the sandwiched body at a temperature of 300 to 700° C. in a pressurized condition.

* * * * *